A. GENTON.
WHEEL CONSTRUCTION.
APPLICATION FILED SEPT. 29, 1919.
1,379,859.
Patented May 31, 1921.
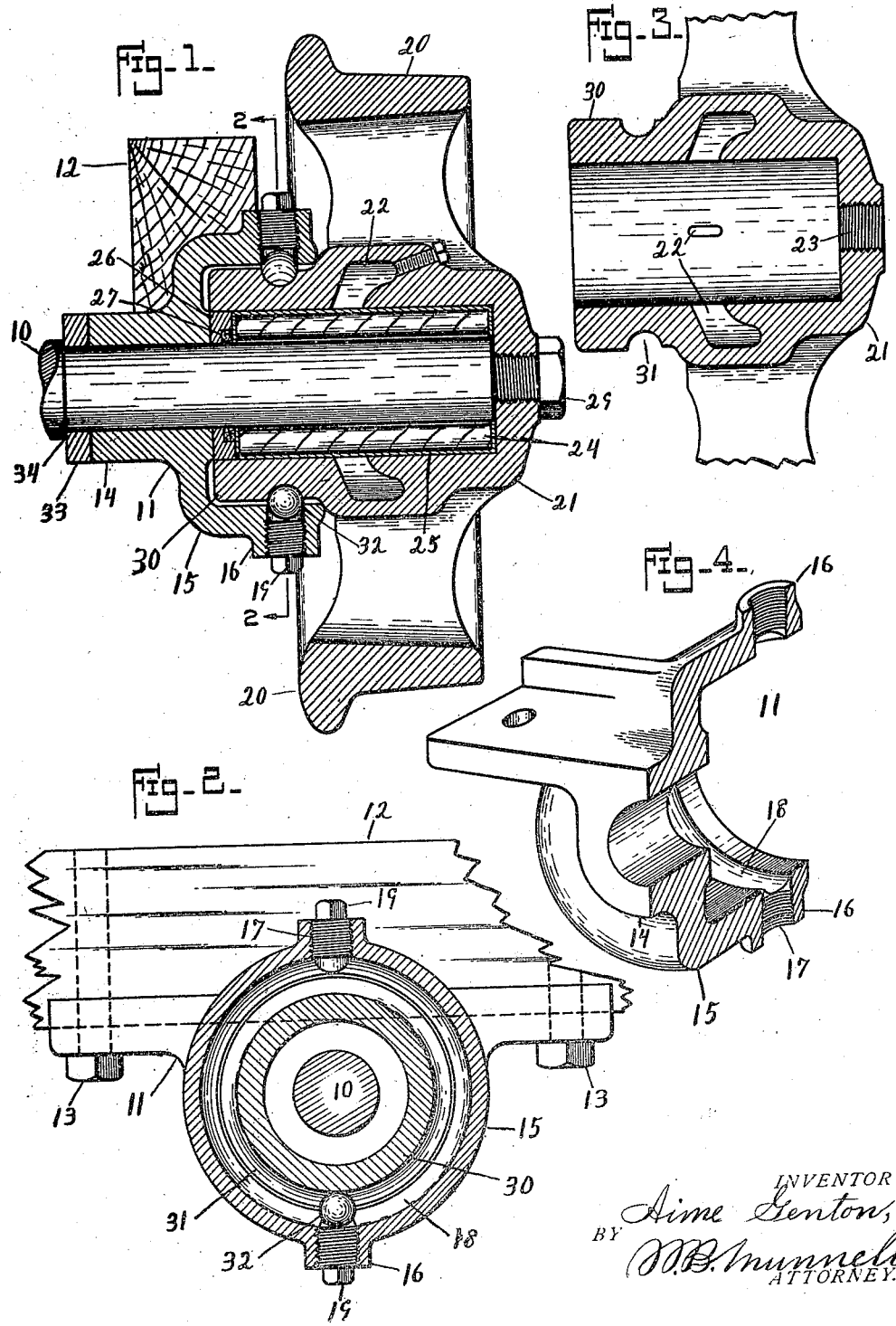

of this page.

UNITED STATES PATENT OFFICE.

AIME GENTON, OF LOUISVILLE, KENTUCKY, ASSIGNOR OF ONE-THIRD TO ROBERT L. SCHMITT, OF LOUISVILLE, KENTUCKY.

WHEEL CONSTRUCTION.

1,379,859.

Specification of Letters Patent. Patented May 31, 1921.

Application filed September 29, 1919. Serial No. 327,139.

*To all whom it may concern:*

Be it known that I, AIME GENTON, a citizen of the United States, residing in the city of Louisville, county of Jefferson, and State of Kentucky, have invented certain new and useful Improvements in Wheel Constructions, of which the following is a specification.

This invention relates to an improvement in wheel mountings, and is designed more particularly for use in connection with track guided cars, such as are used about mines, and has for an object the provision of means for retaining the wheel on an axle spindle without the employment of the usual nut or cap.

Another object is the provision of a wheel construction comprising a minimum of parts which can be readily assembled or separated.

A further object is the provision of an antifriction lock which will take the axial thrusts upon the wheel in both directions.

A still further object is the provision of means as characterized which will be economical in construction and durable in service.

With the foregoing and other objects in view, the invention consists of the novel construction and arrangement of parts illustrated in the accompanying drawing, which forms a part of this specification, wherein is set forth an embodiment of the invention, but it is to be understood that such changes and modifications may be resorted to as come within the scope of the appended claim.

In the drawings wherein similar reference characters designate like parts in the several views, Figure 1, is a central vertical longitudinal section through a wheel and bracket bearing showing an embodiment of the invention applied: Fig. 2, a cross section on line 2—2 of Fig. 1; Fig. 3, a central longitudinal section of the wheel hub and Fig. 4, a combined sectional and perspective view of the bracket bearing.

The present embodiment of the invention comprises an axle —10— journaled in a bracket bearing —11— which is secured to the frame —12— of the car, in any suitable manner as by bolts —13—. The bearing comprises a sleeve portion —14— encircling the axle, and a substantially cup shaped portion —15— having on its outer periphery or edge oppositely disposed bosses —16— through which threaded perforations —17— extend to the interior of the cup, opening into an annular groove or race —18—. These openings are perpendicularly alined and are closed by means of screw plugs —19— the inner ends of which are contoured to conform to the groove 18. A wheel —20— provided with a hub —21— is journaled on the axle. The hub is provided with chambers —22— for the reception of a lubricant which may be introduced through an opening —23—. The internal diameter of the hub is greater than the axle, and a roller bearing —24— is interposed between it and the axle. Roller bearings are articles of commerce, and any one of many well known makes may be used, consequently it is not thought necessary to describe them. Bearings such as illustrated come assembled in a sleeve —25—, and it is only needed to slip the assembly into the hub. After the bearing is inserted a ring —26— preferably of bronze, or other bearing metal, is fitted tightly in the end of the bore to retain the bearing. The inner edge of the retaining ring is provided with a rabbet for the reception of a washer —27—, of felt or other suitable material which will fit closely about the axle and exclude dirt and dust.

The hub is closed at its outer end except for a central opening —28— in which is a threaded plug —29—. The hub is provided with an extension —30—, the diameter of which is such that it will fit within the cup-shaped portion of the bracket, and is provided with a circumferential groove —31—, which coincides with the groove 18, on the interior of the cup. The registering grooves 18 and 31 in the cup and hub respectively, form a raceway for the reception of a ball —32— which may be introduced thereinto through one of the openings 17. The ball lies half in the hub and half in the bearing cup and effectively prevents withdrawal of the hub from the cup and consequently removal of the wheel from the axle. One ball is sufficient, as it is doubtful if any stress would ever be exerted great enough to shear the ball, but more balls may be used if desired. To place a ball in position, a wheel is placed on the axle and pushed back thereon until the grooves 18 and 31 coincide, a plug 19, on the upper side of the hub is taken out, a ball dropped in the opening and the plug replaced. To remove a wheel, a plug on the lower side is taken out and the ball will roll out, the wheel may then be pulled off.

Having thus described my invention so that those skilled in the art pertaining thereto can make and use the same,

I claim:

The combination with a frame, of a bearing secured thereto comprising a sleeve having a cylindrical bore and a cup shaped extension thereon, an axle fitting in the sleeve and projecting beyond the same and having an abutting shoulder adjacent the inner end of the sleeve, a wheel having a hub, the inner end of which fits within said cup, said hub and cup being provided respectively with coinciding grooves, a ball positioned in said grooves and lying partly in the hub and partly in the cup and retaining the wheel against withdrawal, said hub being closed at its outer end, a roller bearing held within the hub and surrounding said axle, and a closure for the inner end of the hub to retain the bearing in place, said closure bearing against said sleeve whereby to hold the closure against accidental displacement.

AIME GENTON.